March 17, 1931. S. W. AVIS 1,796,680
METHOD OF MAKING NUT BLANKS
Filed June 23, 1928 3 Sheets-Sheet 1
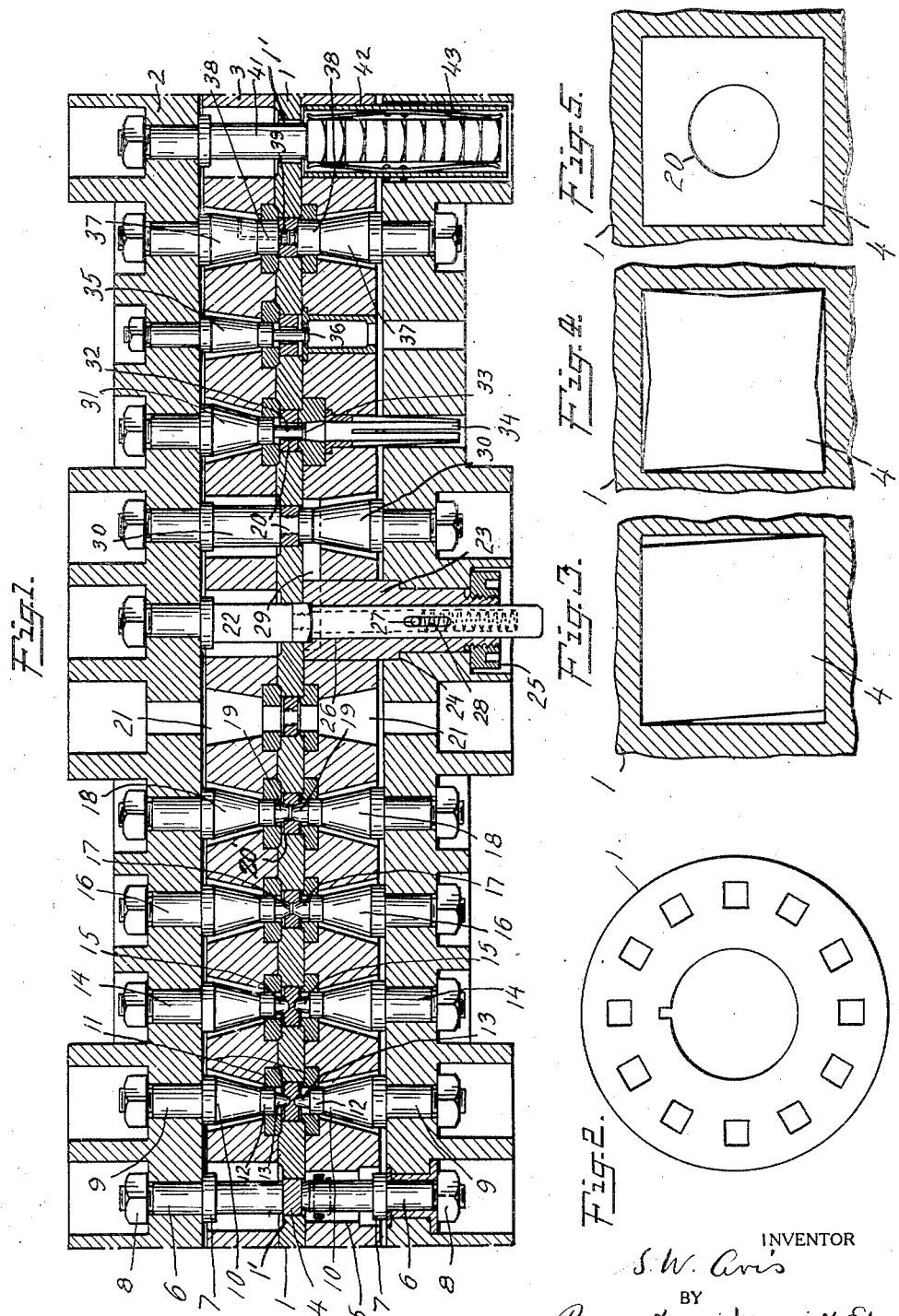

March 17, 1931.  S. W. AVIS  1,796,680
METHOD OF MAKING NUT BLANKS
Filed June 23, 1928   3 Sheets-Sheet 2

INVENTOR
S. W. Avis
BY
Pennie, Davis, Marvin & Edmonds
ATTORNEYS

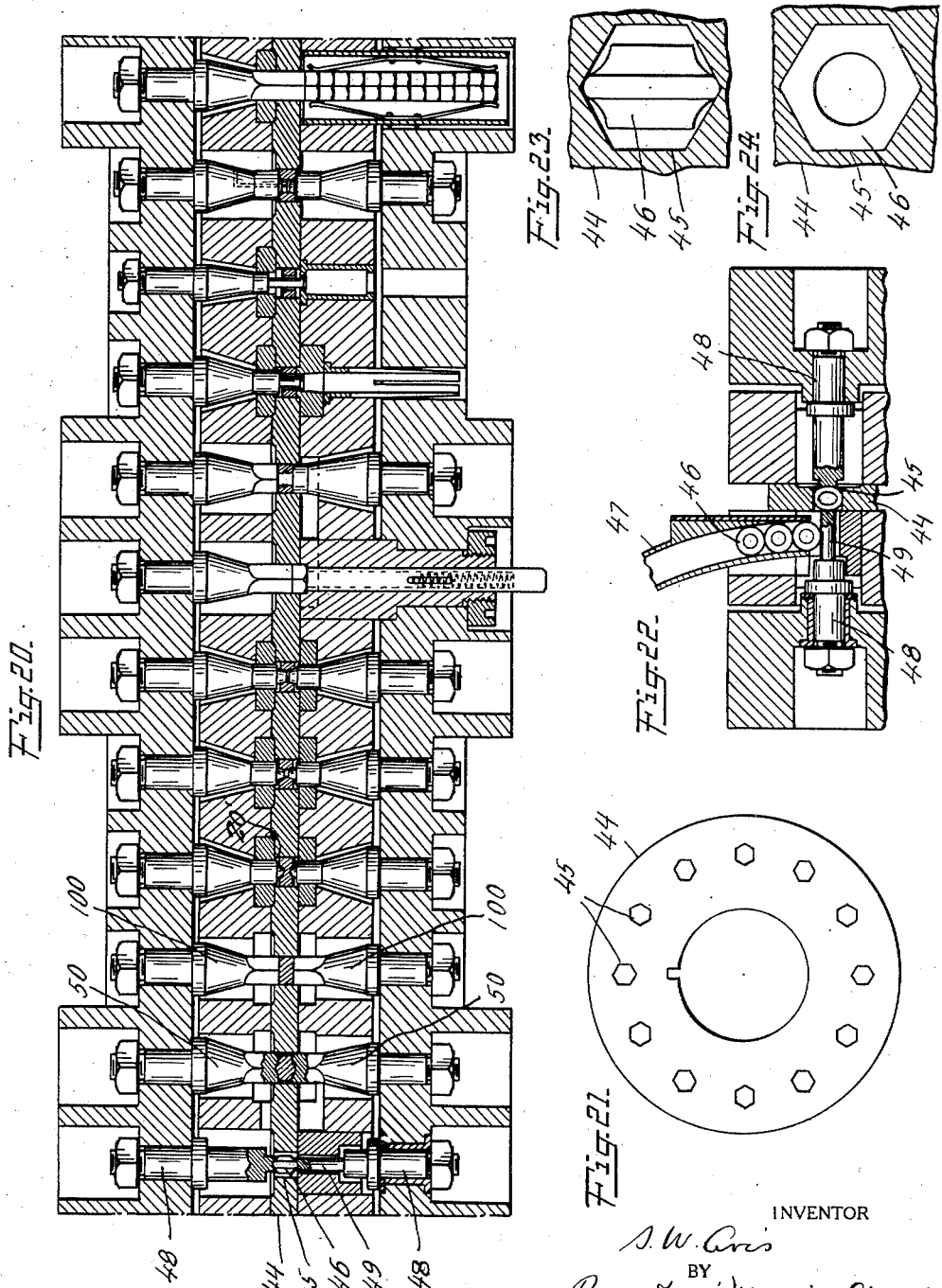

Patented Mar. 17, 1931

1,796,680

UNITED STATES PATENT OFFICE

SAMUEL W. AVIS, OF GREENWICH, CONNECTICUT, ASSIGNOR TO RUSSELL, BURDSALL & WARD BOLT & NUT COMPANY, OF PORT CHESTER, NEW YORK, A CORPORATION OF NEW YORK

METHOD OF MAKING NUT BLANKS

Application filed June 23, 1928. Serial No. 287,795.

This invention relates to a method of making nut blanks.

Heretofore nuts have been made from blanks of substantially the same diameter or cross-sectional area as the finished nut, and the center hole has been formed by punching out the metal from the stock or blank. In making hexagonal nuts a square blank is generally used and the corners of the blank removed by a punching operation to produce a hexagonal cross-section. Originally the blanks from which the nuts were to be made were heated and then punched, but the hot punch process has now been largely superseded by the cold punch process and the central opening in the nut blank formed by punching the stock while cold. Nut blanks are also turned from formed bars in screw machines. These processes produce a satisfactory product but the scrap or waste involved is equal to about 50% of the metal used.

In the present invention I eliminate substantially all of this waste by forming a nut from an unheated blank containing substantially the same volume of metal as the finished nut. The blank, which is smaller in diameter or cross-section, than the finished nut is placed in a die of the proper size and the center opening is formed therein by recessing punches entering the blank from opposite sides and forming the metal outwardly toward the side walls of the die and back on the punches to form the central opening and fill the die the faces of the blanks being unconfined during the punching operations.

I am aware that pressed nuts have been made from heated stock in which the metal is forced outwardly in a die to form the central opening of the nut and produce a nut of the desired size, but such methods are subject to all the disadvantages of the hot punch process and the saving in material effected is not sufficiently advantageous to overcome the disadvantages and additional operations caused by the necessity of heating the stock.

It has also been proposed to form a nut from an unheated blank of substantially the same volume as the volume of the finished nut by forcing the metal outwardly to form the central opening by a series of punching operations using punches entering the blank from one side and supporting the blank in a die having a closed-bottom. However, the force necessary to cause the metal to move in this manner is so great that such processes have not been commercially practicable owing to rapid wear and breakage of the punches and dies.

In my process I use an unheated blank which is placed in a die of the contour of the finished nut and the metal is caused to flow outwardly toward the side walls of the die pocket and axially of the die pocket to fill the die and form a central opening in the nut blank by a plurality of recessing operations performed by recessing punches entering the blank from opposite sides and progressively forcing the metal from the center toward the walls of the die pocket with the faces of the blank unconfined throughout the recessing operation to prevent trapping of the metal and consequent breakage of the dies or other parts of the apparatus. The punches are provided with heads which progressively increase in size so that the second set of punches are larger than the recess formed by the first set of punches and each set of punches progressively enlarges the recess formed in the blank to finally produce an opening requiring very slight trimming to produce the nut blank with a central opening of the desired size.

In practicing the process I preferably lubricate the apparatus in which the process is carried out so as to trap a body of oil in the recesses in the opposite faces of the nut blank and these bodies of oil are compressed during the next punching operation and exert hydraulic pressure on the blank to force the metal outwardly.

The accompanying drawings illustrate, diagrammatically, suitable apparatus for use in practicing the process.

In the drawings, Fig. 1 is a development of a dial having a plurality of die pockets and stripper blocks and tool holders arranged on each side thereof;

Fig. 2 is a front elevation of the dial showing the die pockets;

Fig. 3 is a detailed, enlarged view of one of the die pockets showing one form of blank used in making square nuts;

Fig. 4 is a similar view showing another form of blank;

Fig. 5 is a similar view showing the blank after the central opening has been formed;

Fig. 20 is a view similar to Fig. 1 illustrating the manufacture of hexagonal nuts;

Fig. 21 is a front elevation of the dial employed in the manufacture of hexagonal nuts;

Fig. 22 is a detailed, sectional view of the dial and associated parts showing the feeding mechanism for the blanks; and Figs. 23 and 24 are enlarged detailed views of die pockets illustrating steps in the manufacture of a hexagonal nut.

Figure 6:
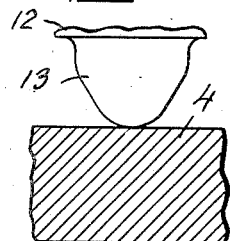
Figs. 6 to 13 illustrate diagrammatically the operation of the recessing punches when lubrication is employed in practicing the process.

In practicing the process of my invention, suitable means are employed for feeding the blanks to a dial and rotating the dial with a step by step motion so that each of the die pockets of the dial will be consecutively brought into alignment with each set of operating tools. This, of course, is not an essential feature of the process and the process may be performed on a single blank by means of any suitable apparatus, but in using the invention on a commercial scale the provision of means for simultaneously operating on a plurality of blanks is an advantage in that it permits production on a scale comparable with production according to the now used cold punch process in which the central opening in the blank is formed and trimmed in two punching operations. The apparatus herein diagrammatically illustrated is shown more fully in the copending application of Avis and Ames Serial No. 287,828 filed June 23, 1928. A full and complete description of such apparatus is not essential to the process and such apparatus will be but briefly described in this specification. It consists of a dial 1 having a plurality of die pockets 1' of suitable size and cross-section to produce nut blanks of the desired type. This dial is given a step by step rotary movement by suitable drive mechanism (not shown) and between each pair of its movements it pauses a sufficient length of time to permit the tools to operate on the blanks in the die pockets. As shown a tool holder 2 is arranged on each side of the dial and stripper blocks 3 are arranged between the dial and the tool holder. The tool holders and stripper blocks are connected to suitable drive mechanism (not shown) to reciprocate them and the dial is rotated when the tool holders and stripper blocks are in open position and it is stationary at the time when the tool holders and stripper blocks close so that the various tools carried by the tool holders can operate on the blanks in the die pockets.

At the first position of the dial, a nut blank 4 is fed through a recess 5 in one of the stripper blocks into alignment with one of the die pockets 1'. At this station, the tool holders are each provided with punches 6 which pass through openings in the tool holders and are provided with enlargements 7 intermediate their ends, which are adapted to engage the faces of the tool holders on the sides adjacent the stripper blocks. The stems of the tools are threaded for the reception of nuts 8 which retain them in position. The tools extend through recesses in the stripper blocks, and, when the parts are in closed position, they are adapted to barely enter the die pocket 1' as shown in Fig. 1 of the drawings. As the punch 6 to the bottom of Fig. 1 of the drawings moves inwardly, it engages the blank 4 which is in the dotted line position and feeds it into the die pocket. The movement of the blank into the die pocket is limited by the punch on the opposite side which engages the opposite side of the blank to properly position it in the die pocket.

The tool holders and stripper blocks then open, the dial is rotated and the blank passes to the second position where the first recessing punches 9 are carried by the tool holders. These punches are secured in the tool holders in the manner heretofore described and pass through openings in the stripper blocks. As shown the portion of the punch passing through the stripper blocks is conical as indicated at 10. The front faces of the stripper blocks are provided with discs 11 having openings therein to receive a circular portion 12 of the punch. Beyond this circular portion, the punch is provided with a cone-shaped head 13 which is adapted to enter the nut blank a slight distance when the tool holders are in closed position and form the first recess in the face of the blank.

Somewhat similar punches 14 are provided at the next stage, and these punches are secured in the tool holders and extend through openings in the stripper blocks in the manner heretofore described. These punches are provided with heads 15 of more rounded contour than the cone shaped heads 13 of the first recessing punches, and these heads are adapted to continue the operation of forcing the metal toward the side walls of the die pockets and thus enlarge the recesses formed in the opposite faces of the blank.

Similarly at the next stage punches 16 are provided having punch heads 17 of still greater cross-sectional area than the punch heads 15 and adapted to progressively continue the forcing of the metal toward the side walls of the pocket.

At the next stage punches 18 are provided having punch heads 19 which are substantially cylindrical and of a diameter slightly greater than the diameter of the opening in the finished nut blank. When the blank first enters the dial it is smaller in cross-section than the die pocket as shown in Figs. 3 and 4. Fig. 5 shows the blank after the series of punching operations with the central opening 20 formed therein, and the metal forced outwardly from the central opening to fill the die pockets. The number of punching operations may be varied under different conditions. In Fig. 1 of the drawings I have shown the dial provided with a station 21 in which other punches may be inserted.

The thickness of the dial and corresponding height of the die pockets is greater than the height of the nut blank, either before, during or after recessing, so that the faces of the blank are always within the die pocket providing a space 20' between the face of the nut blank and disk 11 into which the metal can flow. The contour of the heads of the recessing punches is such that the cylindrical portion 12 does not contact with the faces of the nut blank and these faces are therefore unconfined throughout the recessing operations.

After the recessing operations have been completed the nut blank is cupped and one of the tool holders is provided with a punch 22 which is adapted to cooperate with a cupping die 23 carried by the other tool holder. As shown the cupping die extends through an opening in the stripper block and is provided with a reduced portion forming a shoulder 24 which is adapted to engage a shoulder formed in the opening in the tool holder. The outer end of the cupping die is threaded for the reception of a nut 25 which holds it in position. It is also provided with a central opening for the reception of an ejector 26 and the ejector is provided with a slot adapted to receive a pin 27 carried by the cupping die. A coil spring 28 is arranged in a recess in the ejector and bears against this pin. The position of the ejector is constant with respect to the bed of the machine, and the outer end bears against a rod (not shown) to retain it in position when the tool holders move and thus eject the nut from the cupping die. As shown in Fig. 1 of the drawings the punch 22 is adapted to extend a considerable distance into the die pocket and force the nut blank partially out of the die pocket against the cupping die performing the cupping operation. In the operation some of the displaced metal flows toward the walls of the die pocket and some of it flows back into the central opening. The stripper block on this side of the dial is provided with a groove 29 extending to the next station. At this next station the tool holders are provided with punches 30 which are adapted to re-seat the blank in the dial pocket, and flatten it to its proper thickness. The punches 30 engage the faces of the blank, but at this time the central opening 20 has been formed, and any excess metal caused to flow by the pressure of these punches flows into the central opening.

Figure 18:
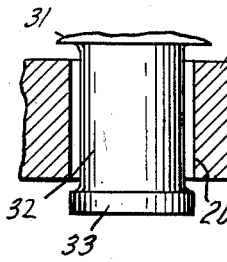
Fig. 18 is a detailed view of a trimming punch shown in operative position with respect to the nut blank.

At the next position one of the tool holders is provided with a trimming punch 31 having a neck 32 shown on an enlarged scale in Fig. 18 of the drawings. As shown in Fig. 18, the neck of the punch is of slightly smaller diameter than the opening 20 in the nut blank and it is provided with a head 33 on its outer end which is of the same diameter as the diameter of the opening 20. When the tool holders are in closed position, this punch extends entirely through the blank, and the scrap trimmed from the blank passes through a tube 34 arranged in the stripper block and tool holder on the opposite side of the dial. At the next station a safety punch 35 is arranged in one of the tool holders and is provided with a neck 36 of smaller diameter than the diameter of the opening 20. The safety punch is provided to eject any scrap not properly ejected after the trimming operation and to eject the trimming punch if it should be broken and remain in the central opening 20. This safety punch functions, in case of breakage of the trimming punch. It then trims an opening in the blank of smaller diameter than would be formed by trimming punch 31. This prevents subsequent breakage of taps used in threading the blanks, but, at the same time, the opening formed by the safety punch is sufficiently different from that formed by the trimming punch to be noticeable and attract the operator's attention. The broken trimming punch may then be removed.

Figure 19:
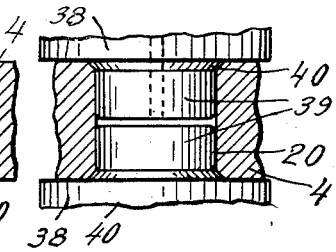
Fig. 19 is a similar view of a pair of counter-sinking punches.

After the central opening has been trimmed, the ends of the opening are countersunk. At the next position I employ a pair of punches 37 carried by the tool holders. Adjacent their ends these punches are provided with cylindrical sections 38, carrying heads 39. The heads 39 are of substantially the same size as the central opening 20 and are adapted to enter the opening as shown in Fig. 19 of the drawings. At the inner ends of these heads, I provide bevelled or inclined surfaces 40 which engage the ends of the wall of the central opening as shown in Fig. 19 of the drawings to force the metal outwardly toward the walls of the die pocket and form the counter-sinking. The heads 39 within the opening prevent the metal that is caused to move from flowing into the central opening of the nut. The provision of counter-sinking at the ends of the central opening facilitates the subsequent threading of the nut.

At the next position one of the tool holders is provided with a punch 41 which extends through the dial when the tool holder is in closed position, and projects the finished blank into a tube 42 having spring holders 43.

In the form of the invention shown in Figs. 20 to 24 of the drawings I employ a dial 44 having hexagonal openings 45 to produce hexagonal nut blanks. The development shown in Fig. 20 is substantially the same as that shown in Fig. 1. That portion of the dial shown to the right and the corresponding portions of the stripper blocks and tool holders is essentially the same. In manufacturing hexagonal nuts I preferably employ a blank 46 (see Fig. 23) in the form of a button, although the blank may be of any desired form. In making square nuts the blanks are fed into the dial pockets by the feeding punches as heretofore described and immediately acted on by recessing punches. In making a hexagonal nut the blanks 46 are preferably fed as shown in Fig. 22 of the drawings with their faces extending across the dial, the blanks being delivered through a chute 47 in alignment with the feeding punches 48. These feeding punches are mounted in the tool holder in a manner heretofore described and one of them is provided with a reduced stem 49 to permit it to clear the bottom of the chute 47 and feed one of the blanks into the pocket of the dial. When the punches 48 reach the closed position shown in Figs. 20 and 22 of the drawings, they also squeeze the blank, and re-shape it so that it will engage opposite corners of the die pocket to hold it in place.

At the next station the nut is again squeezed between punches 50. These punches have cylindrically concaved faces which permit the metal to flow freely toward the side walls of the die pocket. The blank after the second squeezing operation is shaped as shown in Fig. 20 of the drawings and is ready for the first flattening operation.

At the next positions I provide flattening punches 100 which flatten the blank and prepare it for the recessing punches. Thence the operations are substantially the same as heretofore described in connection with the production of square nut blanks and the same reference numerals used in Fig. 1 are applied to the remaining punches and other tools shown in Fig. 20.

Figure 12:
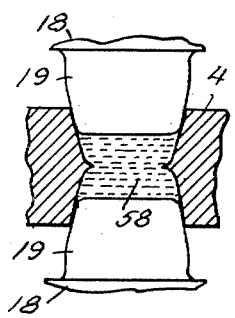
Figure 7:
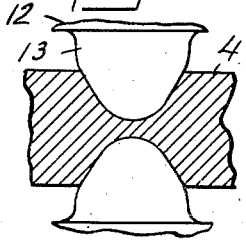
Figure 9:
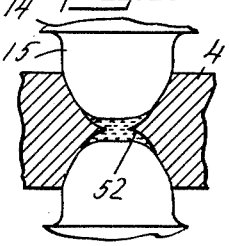
Figure 13:
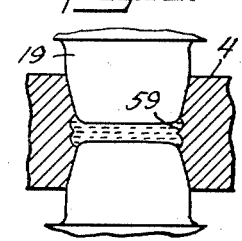
Figure 14:
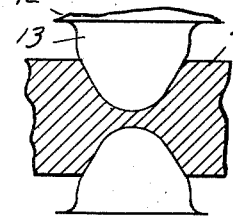
Figs. 14 to 17 illustrate the same steps without lubrication.

Figs. 6 to 17 illustrate the operation of the recessing punches with and without lubrication. In Fig. 6 the first punch heads 13 are shown about to enter the blank and Fig. 7 shows the punch heads 13 at the end of the operation with the first recesses formed in the nut blank. Fig. 14 shows the punch heads 13 at the end of a stroke illustrating the operation when the punches are used without lubrication. At the end of this first punching operation the recess formed is the same whether lubrication is employed or not.

Figure 8:
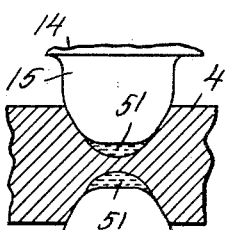
Figure 15:
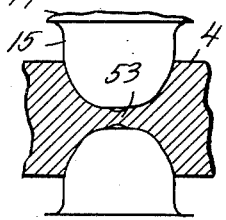

Fig. 8 shows the punch head 15 entering the recess previously formed by the punch head 13. Due to its more rounded contour it will trap a body of oil 51 between it and the bottom of the recess and as the punch heads 15 continue to move inwardly, this body of oil is compressed and exerts hydraulic pressure forcing the metal between the bottom of the two recesses outwardly toward the side walls of the pocket and finally producing a recess extending through the blank as indicated at 52 in Fig. 9 of the drawings. Some of the oil may seep out between the punch head and the wall of the recess, but sufficient will be retained to produce an ample pressure when the punch heads compress it. If lubrication is not employed, the metal is merely forced outwardly by the punch head itself and the two recesses on the opposite faces are not joined but are separated by a section of metal 53 as shown in Fig. 15 of the drawings.

Figure 10:
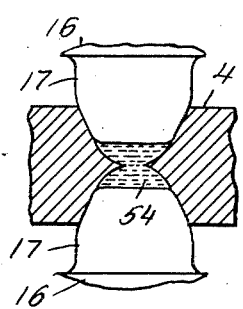
Figure 11:
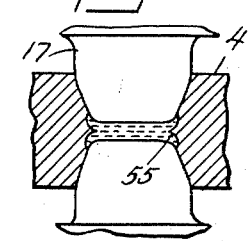
Figure 16:
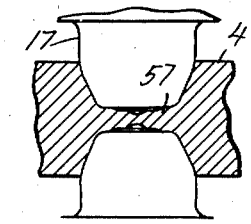

Figs. 10, 11 and 16 of the drawings show the operation of the third set of recessing punches. When the punch head 17 enters the recess made by the punch head 15 it likewise traps a body of oil 54 between the two punch heads as shown in Fig. 10 and as these punches continue to move inwardly the body of oil is compressed causing it to exert hydraulic pressure on the metal of the blank and producing a recess having a wall as indicated at 55 in Fig. 11 of the drawings. If lubrication is not employed the result obtained is as illustrated in Fig. 16 of the drawings with the two recesses from the opposite faces separated from each other by a section 57 of metal.

Figure 17:
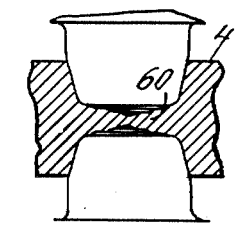

When the punch heads 19 of the next set of recessing punches enter the recess formed by the punch heads 17, they also trap a body of oil 58 as shown in Fig. 12 of the drawings and as they move inwardly this body of oil is compressed as indicated in Fig. 13 of the drawings, causing it to exert hydraulic pressure on the metal and forcing the metal toward the walls of the die pocket to produce a recess having a side wall as indicated at 59. If lubrication is not employed the shape of the recesses is substantially the same as that of the punch heads and is shown in Fig. 17 of the drawings, the recesses formed in the opposite faces are separated from each other by a section 60 of metal. Further compression of the metal by the punches 19 would rapidly increase the density and hardness of the metal 60 and form a hard ring which is difficult to tap.

Lubricating the punches thus aids materially in practicing the process as the distance between the punch heads at the end of the operation determines the amount of scrap to be removed if the punch heads are not lubricated, whereas when lubrication is employed and oil trapped in the recesses, hydraulic pressure can be exerted to complete the recessing of the blank and materially reduce the amount of scrap to be removed by the trimming punch 31. This not only serves to reduce the amount of scrap and waste but also materially simplifies the process as it decreases the strain on the trimming punch 31 and reduces the liability of breakage of the stem 32 of this punch, and produces a wall in the nut which is easy to tap.

The squeezing and flattening steps, illustrated in Fig. 20, may also be employed in the manufacture of square nuts. I have found that this initial movement of the metal while not essential, apparently places it in better condition for the subsequent operations of the recessing punches, and causes it to flow more readily toward the side walls of the pockets. The blanks may originally be of any desired shape containing the proper volume of metal, and the forms shown as merely by way of illustration.

Throughout the preliminary operations of squeezing and flattening, punch heads are employed which will cause the metal to flow in directions that cause the least possible strain. During the recessing of the blank, the metal may give toward the side walls and back on the punches toward the open top and bottom of the die pockets, and there is no binding as would occur in a die with a closed bottom. Causing the metal to flow in this manner produces a nut that is considerably stronger than one produced by the present cold punch process.

I claim:

1. The process of making nut blanks which comprises placing a blank having a volume of metal substantially equal to the volume of metal in the finished nut in a die, forming recesses in opposite faces of the blank, trapping a body of oil in each recess, and compressing the oil to force the metal outward toward the side walls of the die and form a central opening.

2. The process of making nut blanks which comprises placing a blank having a volume of metal substantially equal to the volume of metal in the finished nut in a die forming recesses in opposite faces of the blank by means of a pair of punches, placing the blank between a second pair of punches having heads of different contour to trap a body of oil in each recess, and feeding the punches inwardly to compress the oil and exert hydraulic pressure on the metal to force it outwardly toward the side walls of the die.

3. The process of making nut blanks which comprises placing a blank having a volume of metal substantially equal to the volume of metal in the finished nut in a die, forming recesses in the opposite faces of the nut blank by means of a pair of recessing punches, placing the recessed blank between a second pair of punches having heads of different contour trapping a body of oil in each recess under the punches feeding the punches inwardly to compress the oil and exert hydraulic pressure on the metal to force it outwardly toward the side walls of the die, placing the blank between a third pair of punches, trapping oil between the punches in the recesses, feeding the punches inwardly to compress the oil and exert hydraulic pressure on the metal to force it outwardly toward the side walls of the die and trimming the central opening formed.

4. The process of making nut blanks which comprises placing an unheated blank having a volume of metal substantially equal to the volume of metal in the finished nut in a die, and forcing the metal from the center of the blank in a series of successive operations upon opposite faces of the blank to substantially complete the central opening and form the finished side walls of the nut blank with the faces of the blank unconfined throughout said operations.

5. The process of making nut blanks which comprises placing an unheated blank having a volume of metal substantially equal to the volume of metal in a finished nut in a die, forcing the metal away from the center of the blank in a series of successive operations to substantially complete the central opening and form the finished side walls of the nut blank with the faces of the blank unconfined throughout said operations, and then flattening the blank to finish the faces while the central opening is free to permit flow of metal.

6. The process of making nut blanks which comprises placing an unheated blank having a volume of metal substantially equal to the volume of metal in the finished nut in a die, forcing the metal from the center of a blank in a series of successive operations upon opposite faces of the blank to substantially complete the central opening and form the finished side walls of the nut blank with the faces of the blank unconfined throughout said operations, and then flattening the blank to finish the faces while the central opening is free to permit flow of metal.

In testimony whereof I affix my signature.

SAMUEL W. AVIS.